(12) United States Patent
Yu

(10) Patent No.: US 12,405,758 B2
(45) Date of Patent: Sep. 2, 2025

(54) DISPLAY METHOD AND APPARATUS FOR INFORMATION, ELECTRONIC DEVICE, AND PROGRAM PRODUCT

(71) Applicant: Beijing Zitiao Network Technology Co., Ltd., Beijing (CN)

(72) Inventor: Qin Yu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/290,148

(22) PCT Filed: May 10, 2022

(86) PCT No.: PCT/CN2022/092077
§ 371 (c)(1),
(2) Date: Nov. 9, 2023

(87) PCT Pub. No.: WO2022/237810
PCT Pub. Date: Nov. 17, 2022

(65) Prior Publication Data
US 2024/0272853 A1 Aug. 15, 2024

(30) Foreign Application Priority Data
May 12, 2021 (CN) .......................... 202110518388.4

(51) Int. Cl.
*G06F 3/14* (2006.01)
(52) U.S. Cl.
CPC ..................................... *G06F 3/14* (2013.01)
(58) Field of Classification Search
None
See application file for complete search history.

(56) References Cited

U.S. PATENT DOCUMENTS

2012/0185797 A1* 7/2012 Thorsen ................ G06F 16/287
715/792
2017/0139919 A1* 5/2017 Ball .................. G06F 16/24578
(Continued)

FOREIGN PATENT DOCUMENTS

CN 106951429 A 7/2017
CN 109725803 A 5/2019
(Continued)

OTHER PUBLICATIONS

Cope, Sara; "CSS Almanac Properties O Overflow"; CSS-Tricks; https://web.archive.org/web/20201126102923/https://css-tricks.com/almanac/properties/o/overflow/; Nov. 2, 2018 (Year: 2018).*
(Continued)

*Primary Examiner* — Matthew Yeung
(74) *Attorney, Agent, or Firm* — BakerHostetler

(57) ABSTRACT

A display method and apparatus for information, an electronic device, and a program product are provided. The method includes: receiving information to be displayed that is sent by a server in response to an information display request triggered by a user for a target object, the information to be displayed includes first-level information and second-level information, the first-level information is information for the target object and the second-level information is a reply to the first-level information; determining a feature attribute of the information to be displayed and determining a display mode for the second-level information according to the feature attribute; and displaying the second-level information in the information display region based on the display mode for the second-level information.

19 Claims, 4 Drawing Sheets

(56) References Cited

U.S. PATENT DOCUMENTS

2017/0206271 A1* 7/2017 Jain ................. G06F 16/3344
2023/0316429 A1* 10/2023 Benfield ............... G06F 16/43
707/743

FOREIGN PATENT DOCUMENTS

| CN | 110188298 A | 8/2019 |
|---|---|---|
| CN | 111309213 A | 6/2020 |
| CN | 111597467 A | 8/2020 |
| CN | 112256166 A | 1/2021 |
| CN | 112328136 A | 2/2021 |
| CN | 113157165 A | 7/2021 |
| JP | 6735398 B1 | 8/2020 |
| WO | WO 2020/220776 A1 | 11/2020 |

OTHER PUBLICATIONS

JSer; "CSS: -webkit-line-clamp / text-overflow | JSer—Front End Interview questions"; https://www.youtube.com/watch?v=J2-NY6lu3Tk ; Oct. 7, 2020 (Year: 2020).*

Ultimater ("Expand and collapse div"; Stack Overflow; https://stackoverflow.com/questions/33951123/expand-and-collapse-div; 2015) (Year: 2015).*

International Patent Application No. PCT/CN2022/092077; Int'l Written Opinion and Search Report; dated Jul. 26, 2022; 8 pages.

"Analysis of the comment function of social APP—product analysis based on Weibo, NetEase Cloud Music, Keep, etc."; https://www.sohu.com/a/213046385 114819; Sohu; Dec. 2017; accessed Nov. 17, 2023; 17 pages.

"App Product Design "Operation Tool" Comment System"; https://www.jianshu.com/p/141410338fa9; Jianshu; Feb. 2020; accessed Nov. 17, 2023; 11 pages.

* cited by examiner

DISPLAY METHOD AND APPARATUS FOR INFORMATION, ELECTRONIC DEVICE, AND PROGRAM PRODUCT

CROSS-REFERENCE TO RELATED APPLICATION

The present application is the U.S. National Stage of International Application No. PCT/CN2022/092077, filed on May 10, 2022, which claims priority of the Chinese Patent Application No. 202110518388.4 filed on May 12, 2021, and entitled "Display Method and Apparatus for Information, Electronic Device, and Program Product", the entire disclosure of which is incorporated herein by reference as part of the present disclosure.

TECHNICAL FIELD

Embodiments of the present disclosure relate to the field of computer, and in particular, to a display method and apparatus for information, an electronic device, and a program product.

BACKGROUND

With the development of the Internet technology, the user can browse different types of the multimedia content such as a video content, a news content, and an image content, through the multimedia application. To enable the user to have more interaction experience, the multimedia application further provides information posting and information viewing functions for the user. In the prior art, when information to be displayed includes multiple levels of information, a display mode for the information to be displayed may be fixed.

SUMMARY

In view of the above problems, the embodiments of the present disclosure provide a display method and apparatus for information, an electronic device, and a program product, such that different display modes are used for the information to be displayed with different feature attributes, the efficiency of a user obtaining information is improved.

In a first aspect, embodiments of the present disclosure provide a display method for information, which includes:
receiving information to be displayed in response to an information display request triggered by a user, the information to be displayed includes first-level information and second-level information, the second-level information is a reply to the first-level information;
determining a feature attribute of the information to be displayed and determining a display mode for the second-level information according to the feature attribute; and
displaying the second-level information in an information display region based on the display mode for the second-level information.

In a second aspect, embodiments of the present disclosure provide a display apparatus for information, which includes:
an interaction module configured to receive information to be displayed that is sent by a server in response to an information display request triggered by a user for a target object, the information to be displayed includes first-level information and second-level information, the second-level information is a reply to the first-level information;
a processing module configured to determine a feature attribute of the information to be displayed and determine a display mode for the second-level information according to the feature attribute; and
a display module configured to display the second-level information in an information display region based on the display mode for the second-level information.

In a third aspect, embodiments of the present disclosure provide an electronic device, which includes at least one processor and a memory, the memory stores a computer-executable instruction; and the at least one processor executes the computer-executable instruction stored on the memory and is caused to execute the method according to anyone of the first aspect.

In a fourth aspect, embodiments of the present disclosure provide a computer-readable storage medium, a computer-executable instruction is stored on the computer-readable storage medium, and a processor, upon executing the computer-executable instruction, implements the method according to anyone of the first aspect.

In a fifth aspect, embodiments of the present disclosure provide a computer program product which includes a computer instruction, the computer instruction upon being executed by a processor implements the method according to anyone of the first aspect.

In a sixth aspect, embodiments of the present disclosure provide a computer program, the computer program is configured to implement the method according to anyone of the first aspect.

BRIEF DESCRIPTION OF THE DRAWINGS

To clearly illustrate the technical solution of the embodiments or prior art of the present disclosure, the drawings required in the description of the embodiments or prior art will be briefly described in the following; it is obvious that the described drawings are only some embodiments of the present disclosure. For those skilled in the art, other drawings can be obtained based on these drawings without any inventive work.

DETAILED DESCRIPTION

To make the objects, technical solutions and advantages of the present disclosure clearer, the technical solutions of the embodiments of the present disclosure will be described clearly and fully understandable in conjunction with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

With the development of the Internet technology, the user can browse different types of the multimedia content such as a video content, a news content, and an image content, through the multimedia application.

To enable the user to have more interaction experience, the multimedia application further provides information posting and information viewing functions for the user. The information may include but be not limited to comment information on a target object and post information on a forum. The following detailed description is made by taking the comment information for example.

Figure 1:
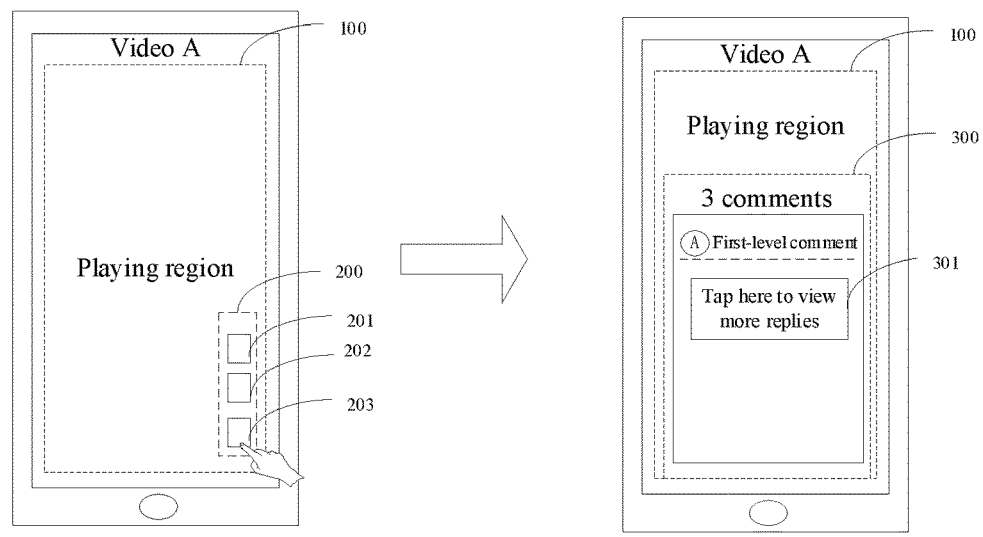
FIG. 1 is a schematic diagram of a first interface of a display method for information in the prior art.

FIG. 1 is a schematic diagram of a first interface of a display method for information in the prior art. FIG. 1 illustrates a varying interface of a player application based on the video type, a main interface of the application includes a playing region 100 for a target video and a function triggering region 200; and a plurality of components are included in the function triggering region 200 to trigger different functions.

A video information viewing component 201 is configured to switch the main interface to a display interface for video details in response to a viewing request initiated by a user for the video details, allowing the user to view some information related to the target video, such as a source, a posting time, author information, and a video introduction of the target video, and a relevant video, in the display interface for the video details.

A video reposting component 202 is configured to buffer the target video on a mobile terminal in the manner of a video file or link information or an image link in response to a reposting request initiated by the user for the target video, allowing the user to transmit the video file or the link information or the image link buffered on the mobile terminal to other users of the player application or transmit the video file or the link information or the image link to other users through other applications.

Moreover, an information component 203 is configured to display an information display region 300 as a popover on the basis of displaying the playing region 100 on the main interface after the information component 203 is triggered by the user, in response to an information display request initiated by the user for displaying the information of the target video. Information to be displayed that is left by a user for the target video will be displayed in the information display region 300. In general, the information to be displayed includes first-level information, and second-level information as a reply to the first-level information. Specifically, the first-level information is a first-level comment for the target video, and the second-level information is a second-level comment as a reply to the first-level comment.

As shown in FIG. 1, in the prior art, the second-level comment may be typically displayed in a folding manner in the information display region. If there is a need for viewing the information to be displayed, a user needs to tap on the folded comment for a plurality of times to allow for unfolded display of the comments. An existing information display mode is single and may be fixed.

Specifically, the information display region 300 may typically display the first-level comments in a tiling manner and display the second-level comments in a complete folding manner so that more first-level comments can be displayed in the information display region 300. At this time, for these second-level comments displayed in the folding manner, an unfolding display component 301 is further provided in the information display region 300. The user can trigger the unfolding display component 301 to switch a folded display state of these second-level comments to an unfolded display state and completely display these second-level comments.

Such an information display mode is inconvenient for the user to browse when there is little information to be displayed. The user needs to perform a plurality of operations of unfolding the information when obtaining the information, and the process is tedious.

Figure 2:
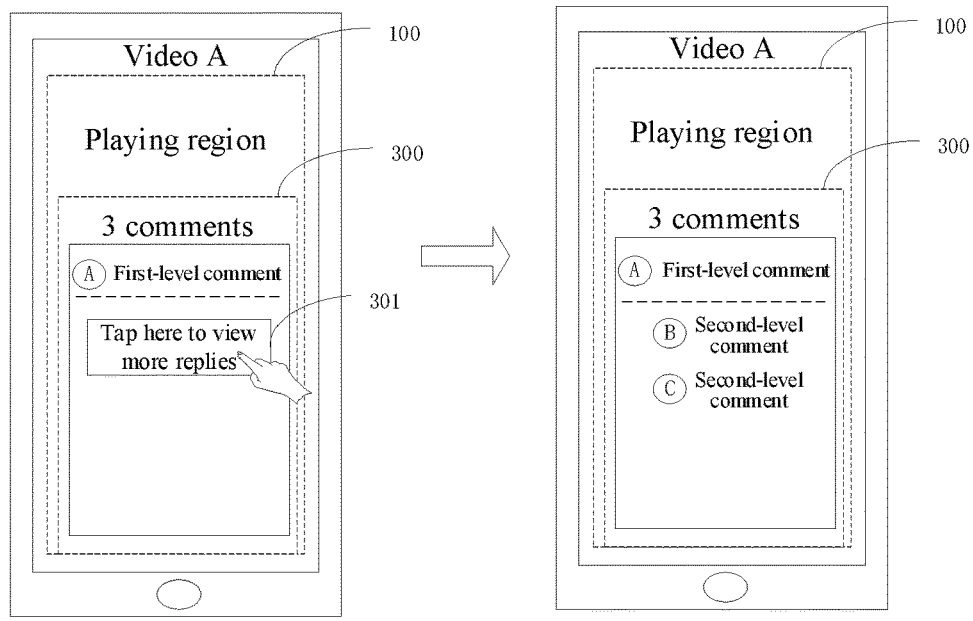
FIG. 2 is a schematic diagram of a second interface of the display method for information in the prior art.

FIG. 2 is a schematic diagram of a second interface of the display method for information in the prior art. As shown in FIG. 2, for a target video, there is only one first-level comment in the information display region 300, and there are two second-level comments under the first-level comment. Apparently, when the second-level comments are displayed in the existing display mode, the user needs to tap on the unfolding display component 301 to unfold the two second-level comments for browsing.

The case in which the second-level comments are completely folded is illustrated in FIG. 1 and FIG. 2. It will be understood that in other embodiments, there is a case in which the second-level comments are partially folded. For example, only one second-level comment is displayed and other second-level comments are folded. In this case, there is still the problem of inconvenience for the user to browse the information.

In other words, since the second-level information is displayed in the folding manner in the prior art, in the case of little information to be displayed for the target object as shown in FIG. 2, the user still needs to perform a plurality of operations of unfolding the information so that the complete second-level information can be viewed.

This leads to low information display efficiency in viewing information, thereby affecting the user's enthusiasm of participating in interaction functions such as information posting and information viewing in the application.

In view of such problems, according to the embodiment of the present disclosure, after receiving the information to be displayed that is sent by a server in response to the information display request triggered by the user for the target object, a feature attribute of the information to be displayed may be determined first such that a display mode for the second-level information is determined according to the feature attribute, and then the second-level information is displayed in the information display region based on the display mode for the second-level information. Compared with the prior art, since the display mode for the second-level information is determined based on the feature attribute, different display modes can be used according to actual situations of the information to be displayed. The efficiency of the user obtaining information is improved.

Figure 3:
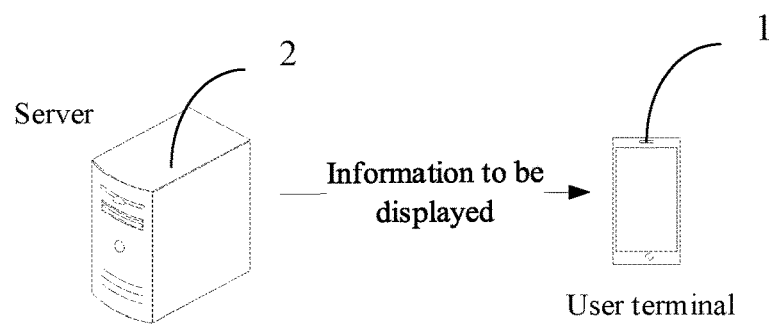
FIG. 3 is a schematic diagram of a network architecture on which the present disclosure is based.

FIG. 3 is a schematic diagram of a network architecture on which the present disclosure is based. The network architecture shown in FIG. 3 may specifically include a user terminal 1 and a server 2.

The user terminal 1 may be specifically a hardware device capable of installing or carrying an application, such as a user's mobile phone, a desktop computer, a smart home device, and a tablet computer. Moreover, the display apparatus for information mentioned in the present disclosure may be specifically integrated in an application of the user terminal 1.

The server 2 may be specifically an independent server or a server cluster disposed on the cloud side and may be configured to provide corresponding application service and application support for the application on the user terminal 1.

The display method for information provided in the present disclosure is carried in the display apparatus for information of the user terminal 1 shown in FIG. 3. The user terminal 1 may connect to the server 2 via a network, and when there is a need for displaying information to be displayed that is sent by the server 2 in the application, the display apparatus for information of the user terminal 1 will process the information to be displayed based on the display method for information provided in the present disclosure, allowing the application to display the information to be displayed.

Figure 4:
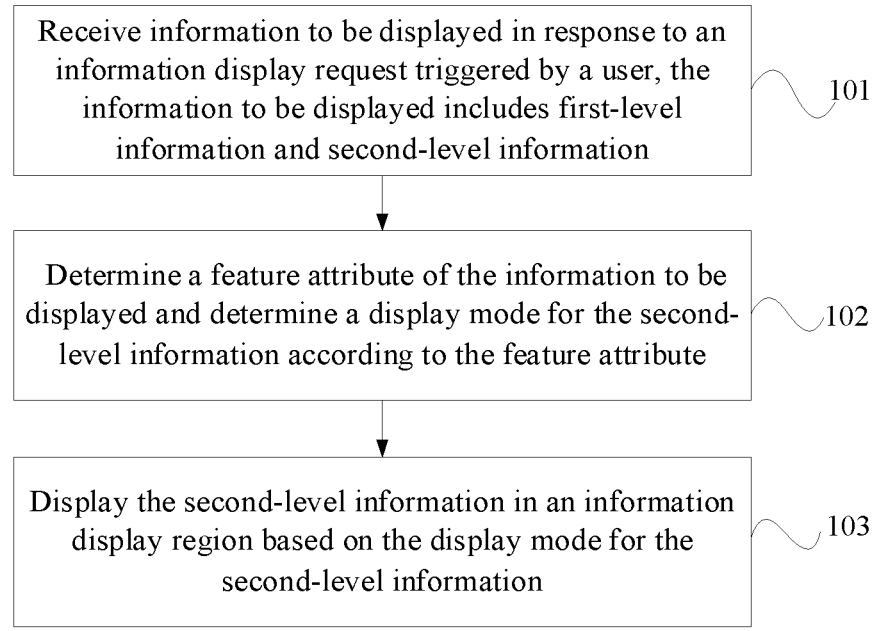
FIG. 4 is a flowchart of a display method for information provided in an embodiment of the present disclosure.

Based on the foregoing network architecture, in a first aspect, FIG. 4 is a flowchart of a display method for information provided in an embodiment of the present disclosure.

The display method for information provided in the embodiment of the present disclosure includes the following steps.

Step 101, receiving information to be displayed that is sent by a server in response to an information display request triggered by a user for a target object, the information to be displayed includes first-level information and second-level information.

Step 102, determining a feature attribute of the information to be displayed and determining a display mode for the second-level information according to the feature attribute.

Step 103, displaying the second-level information in an information display region based on the display mode for the second-level information.

It needs to be noted that a performing agent of the display method for information provided in this example is the display apparatus for information carried by the user terminal. Before performing step 101, the user may browse the target object through an application on the user terminal.

The application may be different types of applications, specifically including but not limited to applications for displaying different types of objects (such as a video object, a text object, and an image object) separately or in combination, such as a video application, a news application, an image application, and a social application. There is no any limitation on the type of the application, and the target object may specifically be any object, including a video object, a text object, an image object, and the like.

It needs to be noted that the application in the present disclosure should provide the user with interaction functions such as information posting and information viewing for the target object.

Firstly, in the present embodiment, the application may provide the user with a display function for the target object. Then, the user may trigger an information viewing component on a target object display interface to view the information to be displayed of the target object.

The display apparatus in the application will receive an information display request triggered by the user for viewing the information to be displayed of the target object and forward the information display request to the server corresponding to the application. The information display request may include a target object identifier. The server may determine current information to be displayed of the target object from the target object identifier in the information display request, and send the current information to be displayed of the target object to the application of the user terminal.

The information to be displayed generally includes first-level information and second-level information, the first-level information is information for the target object, and the second-level information is a reply to the first-level information.

Then, the display apparatus will determine the feature attribute of the information to be displayed and determine the display mode for the second-level information according to the feature attribute. The feature attribute of the information to be displayed may be a number feature attribute representing a number of pieces of information in the information to be displayed and may also be a size feature attribute representing a region height or a region area required for displaying all the information to be displayed. No matter what feature is used, the feature attribute will be used for distinguishing what display mode should be used for the second-level information, the display mode includes but is not limited to displaying in a tiling manner and displaying in a folding manner.

Figure 5:
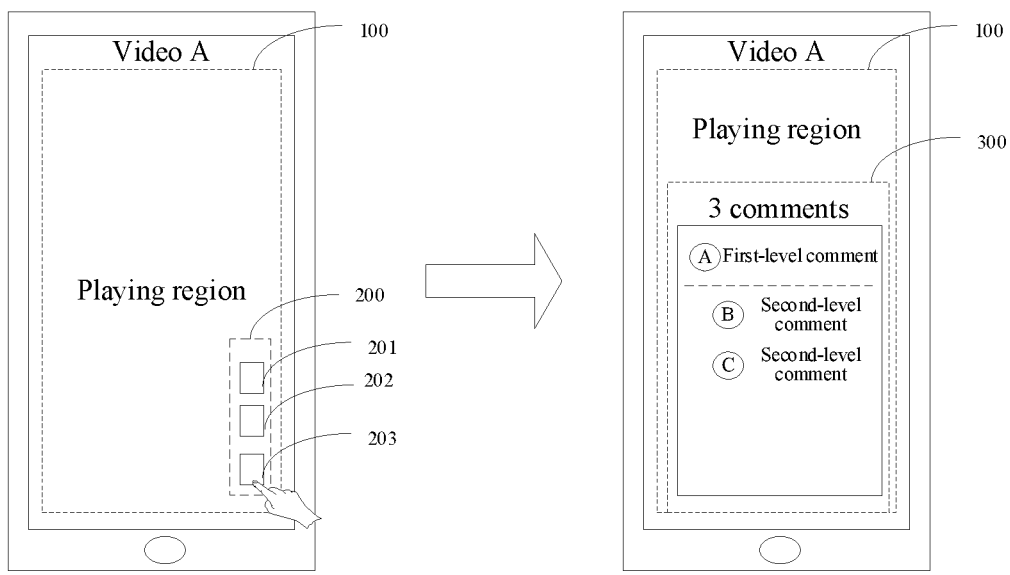
FIG. 5 is a schematic diagram of a first interface of a display method for information provided in an embodiment of the present disclosure.

FIG. 5 is a schematic diagram of a first interface of a display method for information provided in an embodiment of the present disclosure. By comparing the interface of the prior art provided in FIG. 2 with the interface of the embodiment provided in FIG. 5, when the solution provided in the embodiment of the present disclosure is adopted, for a target video, there is only one first-level comment in the information display region 300, and there are two second-level comments under the first-level comment.

Apparently, when the second-level comments are displayed by the prior art shown in FIG. 2, there is a need for tapping on the unfolding display component 301 to unfold the two second-level comments for browsing. In the embodiment shown in FIG. 5, the second-level comments in the information display region 300 will be directly displayed in the tiling manner based on the information attribute.

In other words, the second-level information will be displayed by means of the display apparatus in the information display region based on the display mode for the second-level information. Compared with the display mode of displaying the second-level information in the folding manner used in the prior art, the present disclosure provides diversified display modes for the second-level information, and since different display modes (displaying in the tiling manner or displaying in the folding manner) can be used based on the actual feature attributes of the information to be displayed in the present disclosure, better display efficiency can be achieved especially when the information to be displayed includes little information. In this case, the user can view the second-level information with no need to perform a plurality of tapping operations, and better information obtaining efficiency is provided for the user.

To better describe the display method provided in the embodiment, the solution of determining display modes according to different feature attributes will be further described below.

In an optional embodiment, the feature attribute includes a total number of pieces of information of the information to be displayed. Step 102 in which the feature attribute of the information to be displayed is determined and the display mode for the second-level information is determined according to the feature attribute of the information to be displayed specifically includes: determining the total number of pieces of information of the information to be displayed and determining the display mode for the second-level information according to the total number of pieces of information.

The total number of pieces of information refers to a sum of a number of pieces of information of the first-level information and a number of pieces of information of the second-level information and is used for determining what display mode is used for the second-level information in the information to be displayed. The display mode used for the second-level information can be determined by determining whether the total number of pieces of information is less than a number threshold.

When the total number of pieces of information of the first-level information and the second-level information is less than the number threshold (e.g., 10), in the case of the information display region not rolling, after the first-level information is displayed in the tiling manner in the information display region, the second-level information may also be synchronously displayed in the tiling manner in the information display region. At this time, the display mode of displaying the second-level information in the tiling manner in the information display region may be used.

When the total number of pieces of information of the first-level information and the second-level information is greater than the number threshold (e.g., 10), in the case of the information display region not rolling, after the first-level information is displayed in the tiling manner in the information display region, it is hard to synchronously display the second-level information in the tiling manner. At this time, the display mode of displaying the second-level information in the folding manner in the information display region may be used.

In the present embodiment, based on the feature attribute, i.e., the total number of pieces of information, of the information to be displayed, the display mode for the second-level information displayed in the information display region can be determined, and the information display efficiency can be improved.

In an optional embodiment, the feature attribute includes a display height required by the information to be displayed. Step 102 in which the feature attribute of the information to be displayed is determined and the display mode for the second-level information is determined according to the feature attribute of the information to be displayed specifically includes: determining the display height required by the information to be displayed and determining the display mode for the second-level information according to the display height required by the information to be displayed.

Specifically, the display height required by the information to be displayed is determined according to a number of rows and an information row spacing of the information to be displayed. If a display height of the information display region is greater than or equal to the display height required, the second-level information is displayed in the tiling manner.

Further, the number of rows of the information be displayed includes a number of rows of the first-level information and a number of rows of the second-level information, and the information row spacing includes a first information row spacing and a second information row spacing, the first information row spacing is a row spacing corresponding to the first-level information, and the second information row spacing is a row spacing corresponding to the second-level information. That is, the display height required for displaying the information to be displayed in the tiling manner is determined according to the number of rows of the first-level information, the number of rows of the second-level information, the first information row spacing, and the second information row spacing.

For example, assuming that in the information to be displayed of the target object, the number of rows of the first-level information is a, the number of rows of the second-level information is b, the information row spacing of the first-level information is x and the information row spacing of the second-level information is y, the display height h required by the information to be displayed of the target object may be expressed as: $h=(a*x)+(b*y)$.

When the display height H of the information display region is greater than or equal to the display height h required by the information to be displayed, it means that the information display region is capable of displaying all the information in the tiling manner. At this time, the display mode of displaying the second-level information in the tiling manner may be used.

When the display height H of the information display region is less than the display height h required by the information to be displayed, it means that the information display region is incapable of displaying all the information in the tiling manner. At this time, the display mode of displaying the second-level information in the folding manner may be used.

In particular, in the present embodiment, if the display height H of the information display region is greater than or equal to the display height h required, the display apparatus may also adjust the display height of the information display region according to the display height required for displaying the information to be displayed in the tiling manner to save display space.

Figure 6:
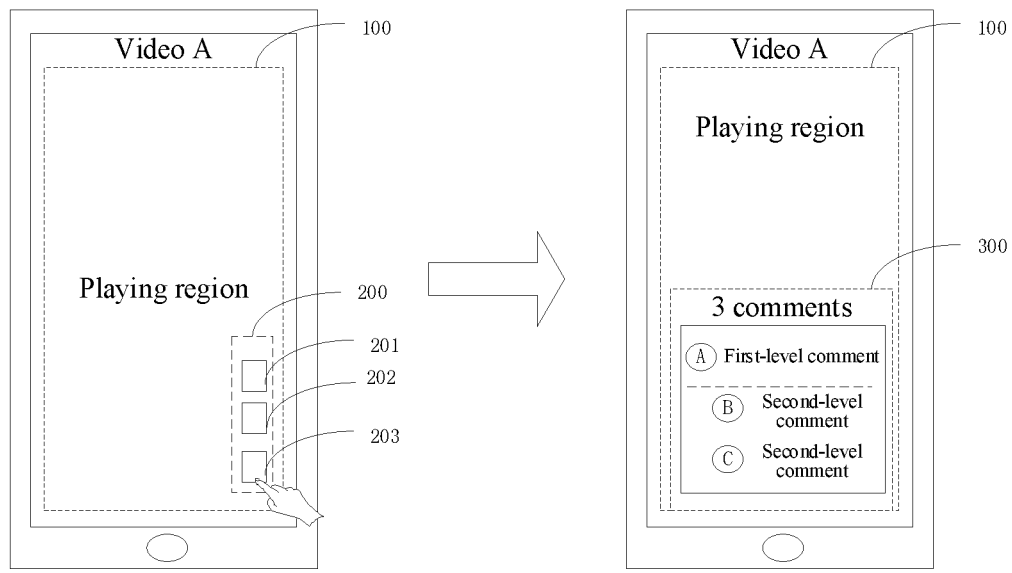
FIG. 6 is a schematic diagram of a second interface of a display method for information provided in an embodiment of the present disclosure.

FIG. 6 is a schematic diagram of a second interface of a display method for information provided in an embodiment of the present disclosure. With reference to the interfaces shown in FIG. 5 and FIG. 6, compared with the display mode in FIG. 5, the original display height H of the information display region 300 will be further adjusted to the display height h required by the information to be displayed in FIG. 6 so that the information to be displayed can be tiled and displayed in the adjusted information display region 300. By such a processing manner, it can be guaranteed that the information display region 300 has enough space for displaying information and can provide more display space for other display contents including a playing region of the target object.

In a further optional embodiment, the feature attribute includes a display area required by the information to be displayed. Step 102 in which the feature attribute of the information to be displayed is determined and the display mode for the second-level information is determined according to the feature attribute of the information to be displayed specifically includes: determining a display area required for displaying the information to be displayed in the tiling manner and determining the display mode for the second-level information according to the display area required by the information to be displayed.

Unlike the foregoing embodiment based on the display height, when considering that the feature attribute is the display area, the display area is determined based on the number of rows and the information row spacing of the information to be displayed and a width of the information display region.

Figure 7:
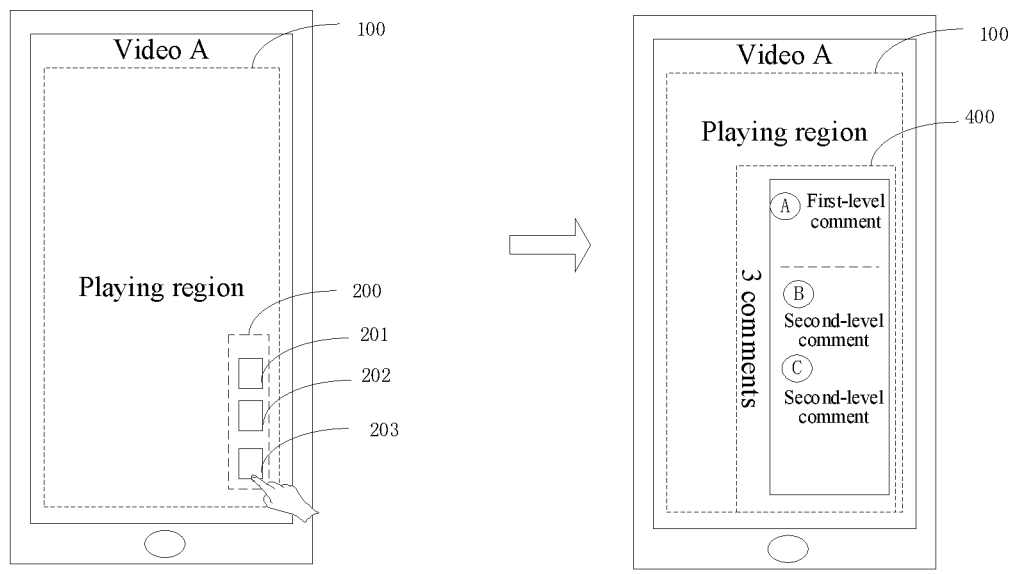
FIG. 7 is a schematic diagram of a third interface of a display method for information provided in an embodiment of the present disclosure.

Specifically, FIG. 7 is a schematic diagram of a third interface of a display method for information provided in an embodiment of the present disclosure. Unlike the foregoing embodiments, in the embodiment shown in FIG. 7, the information display region 400 is limited in width to a certain extent.

In other words, when determining the display mode for the second-level information, firstly, the number a of rows of the first-level information needs to be determined based on the width w of the information display region 400 and a total number of words of each piece of first-level information in the information to be displayed; the number b of rows of the second-level information needs to be determined based on the width w of the information display region 400 and a total number of words of each piece of second-level information in the information to be displayed; then, similar to the foregoing embodiments, the display height h required is obtained according to the number a of rows of the first-level information, the number b of rows of the second-level information, the information row spacing x of the first-level information, and the information row spacing y of the second-level information. In consideration of the width w of the information display region, the display area s required by the information to be displayed is obtained: s=w (ax+by).

Subsequently, whether the mode of displaying in the tiling manner is used for displaying the second-level information may be determined by determining a relationship of size between the display area S of the current information display region and the display area s required. The process is similar to that in the foregoing embodiments, which will not be redundantly described here.

In an optional embodiment, the information display region in the application is typically determined according to a terminal configuration, the terminal configuration is generated and stored on the user terminal when the application is installed on the user terminal, and typically used for recording display information such as a display size of a terminal display panel. According to the terminal configuration, the application may correspondingly configure the display height of the information display region and/or the display area of the information display region and/or the information row spacing such that the display height of the information display region can match a screen size of the terminal, and the information row spacing is adapted to the screen size and a display resolution, thereby providing a better information display effect for the user.

Further optionally, on the basis of the foregoing embodiments, the information to be displayed further includes Nth-level information, the N being a positive integer greater than 2, the Nth-level information is a reply to (N-1)th-level information. The method further includes: determining a display mode for the Nth-level information according to the feature attribute; and displaying the Nth-level information in the information display region based on the display mode for the Nth-level information.

When determining the display mode for the Nth-level information, the condition needing to be met is that the (N-1)th-level information is displayed in the tiling manner in the information display region.

Taking for example that the information to be displayed includes third-level information, in other words, for the third-level information, when the second-level information is displayed in the folding manner, the third-level information will be displayed in the folding manner. On the contrary, when the second-level information is displayed in the tiling manner, the display mode for the third-level information will be determined according to the feature attribute, and the determination process is similar to the process described above.

Figure 8:
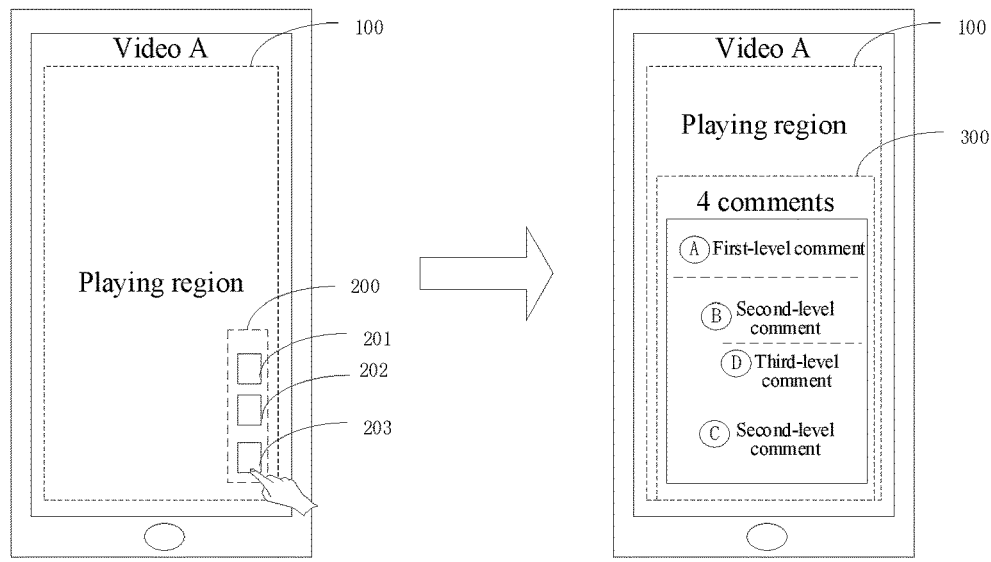
FIG. 8 is a schematic diagram of a fourth interface of a display method for information provided in an embodiment of the present disclosure.

FIG. 8 is a schematic diagram of a fourth interface of a display method for information provided in an embodiment of the present disclosure. As shown in FIG. 8, the information display region 300 further displays a three-level comment. Since the display area needed for displaying all the information to be displayed in the tiling manner is far smaller than the display area of the information display region, in the example of FIG. 8, all of the first-level comment, the second-level comment, and the third-level comment will be displayed in the tiling manner.

A display method for information is provided in the embodiments of the present disclosure. The method includes: receiving information to be displayed that is sent by a server in response to an information display request triggered by a user for a target object, the information to be displayed includes first-level information and second-level information, the first-level information is information for the target object and the second-level information is a reply to the first-level information; determining a feature attribute of the information to be displayed and determining a display mode for the second-level information according to the feature attribute; and displaying the second-level information in the information display region based on the display mode for the second-level information. Since a display mode for second-level information is determined based on a feature attribute of information to be displayed during display, different display modes are used for the information to be displayed with different feature attributes. Therefore, the efficiency with which a user obtains information is increased.

Figure 9:
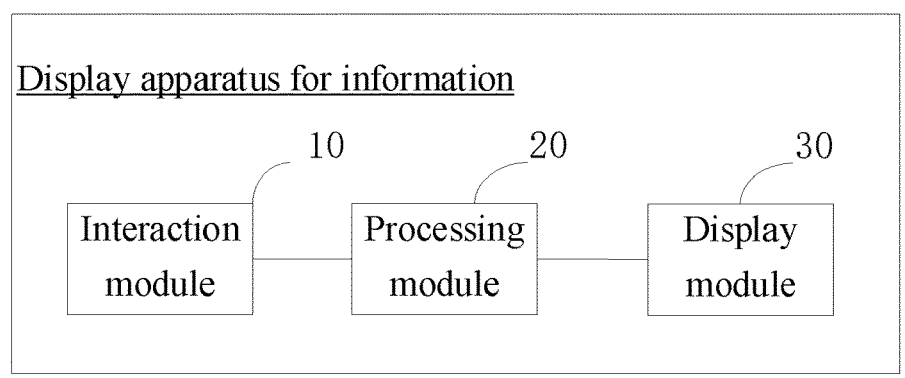
FIG. 9 is a structural block diagram of a display apparatus for information provided in an embodiment of the present disclosure.

In a second aspect, corresponding to the display method for information in the foregoing embodiments, FIG. 9 is a structural block diagram of a display apparatus for information provided in an embodiment of the present disclosure. For ease of description, only the parts related to this embodiment of the present disclosure are illustrated. With reference to FIG. 9, the display apparatus for information includes:

an interaction module 10 configured to receive information to be displayed that is sent by a server in response to an information display request triggered by a user for a target object, the information to be displayed includes first-level information and second-level information, the first-level information is information for the target object and the second-level information is a reply to the first-level information;

a processing module 20 configured to determine a feature attribute of the information to be displayed and determine a display mode for the second-level information according to the feature attribute; and a display module 30 configured to display the second-level information in an information display region based on the display mode for the second-level information.

Optionally, the feature attribute of the information to be displayed includes a total number of pieces of information of the information to be displayed; and the processing module 20 is configured to determine the total number of pieces of information of the information to be displayed and determine the display mode for the second-level information according to the total number of pieces of information.

Optionally, the processing module 20 is specifically configured to determine whether the total number of pieces of information is less than a number threshold, and if the total number of pieces of information is less than the number threshold, display the second-level information in a tiling manner in the information display region.

Optionally, the processing module 20 is specifically configured to, if the total number of pieces of information is greater than or equal to the number threshold, display the second-level information in a folding manner in the information display region.

Optionally, the feature attribute of the information to be displayed includes a display height required by the information to be displayed; and the processing module 20 is specifically configured to determine the display height required by the information to be displayed and determine the display mode for the second-level information according to the display height required by the information to be displayed.

Optionally, the processing module 20 is specifically configured to determine a display height required for displaying the information to be displayed in the tiling manner according to a number of rows and an information row spacing of the information to be displayed, and if a display height of the information display region is greater than or equal to the display height required, display the second-level information in the tiling manner.

Optionally, the processing module 20 is specifically further configured to, if the display height of the information display region is less than the display height required, display the second-level information in the folding manner.

Optionally, the number of rows of the information to be displayed includes a number of rows of the first-level information and a number of rows of the second-level information, and the information row spacing includes a first information row spacing and a second information row spacing, the first information row spacing is a row spacing corresponding to the first-level information, and the second information row spacing is a row spacing corresponding to the second-level information. The processing module 20 is specifically further configured to determine the display height required for displaying the information to be displayed in the tiling manner according to the number of rows of the first-level information, the number of rows of the second-level information, the first information row spacing, and the second information row spacing.

Optionally, if the display height of the information display region is greater than or equal to the display height required, the processing module 20 is specifically further configured to adjust the display height of the information display region according to the display height required for displaying the information to be displayed in the tiling manner.

Optionally, the feature attribute of the information to be displayed includes a display area required by the information to be displayed; and the processing module 20 is specifically configured to determine a display area required for displaying the information to be displayed in the tiling manner and determine the display mode for the second-level information according to the display area required by the information to be displayed.

Optionally, the information to be displayed further includes Nth-level information, the N being a positive integer greater than 2, the Nth-level information is a reply to (N-1)th-level information; and the processing module 20 is specifically further configured to determine a display mode for the Nth-level information according to the feature attribute and display the Nth-level information in the information display region based on the display mode for the Nth-level information.

Optionally, the processing module 20 is further configured to determine the display height of the information display region and/or the information row spacing according to a terminal configuration.

A display apparatus for information is provided in the embodiments of the present disclosure. The apparatus includes: receiving information to be displayed that is sent by a server in response to an information display request triggered by a user for a target object, the information to be displayed includes first-level information and second-level information, the first-level information is information for the target object and the second-level information is a reply to the first-level information; determining a feature attribute of the information to be displayed and determining a display mode for the second-level information according to the feature attribute; and displaying the second-level information in the information display region based on the display mode for the second-level information. Since a display mode for second-level information is determined based on a feature attribute of information to be displayed during display, different display modes are used for the information to be displayed with different feature attributes. Therefore, the efficiency with which a user obtains information is increased.

An electronic device provided in the present embodiment may be used to perform the technical solutions of the method embodiments described above, and may follow similar implementation principles and have similar technical effects to the method embodiments, which will not be redundantly described herein.

Figure 10:
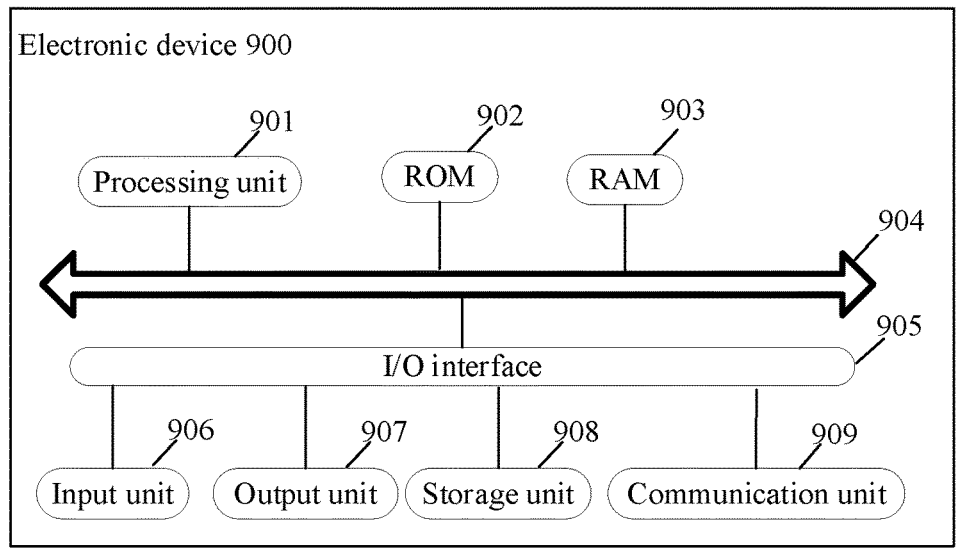
FIG. 10 is a schematic diagram of a hardware structure of an electronic device provided in an embodiment of the present disclosure.

FIG. 10 illustrates a structural schematic diagram of an electronic device 900 adapted to implement the embodiments of the present disclosure. The electronic device 900 may be a terminal device or a media library. The terminal device may include but not be limited to mobile terminals such as a mobile phone, a notebook computer, a digital broadcasting receiver, a personal digital assistant (PDA), a portable Android device (PAD), a portable media player (PMP), and a vehicle-mounted terminal (e.g., a vehicle-mounted navigation terminal), and fixed terminals such as a digital TV and a desktop computer. The electronic device shown in FIG. 10 is merely an example, and should not pose any limitation to the functions and the range of use of the embodiments of the present disclosure.

As shown in FIG. 10, the electronic device 900 may include a processing unit (e.g., a central processing unit, or a graphics processing unit) 901, which can perform various suitable actions and processing according to a program stored on a read-only memory (ROM) 902 or a program loaded from a storage unit 908 into a random-access memory (RAM) 903. The RAM 903 further stores various programs and data required for operations of the electronic device 900. The processing unit 901, the ROM 902, and the RAM 903 are interconnected by means of a bus 904. An input/output (I/O) interface 905 is also connected to the bus 904.

Usually, the following units may be connected to the I/O interface 905: an input unit 906 including, for example, a touch screen, a touch pad, a keyboard, a mouse, a camera, a microphone, an accelerometer, and a gyroscope; an output unit 907 including, for example, a liquid crystal display (LCD), a loudspeaker, and a vibrator; a storage unit 908 including, for example, a magnetic tape and a hard disk; and a communication unit 909. The communication unit 909 may allow the electronic device 900 to be in wireless or wired communication with other devices to exchange data. While FIG. 10 illustrates the electronic device 900 having various units, it is to be understood that all the illustrated units are not necessarily implemented or included. More or less units may be implemented or included alternatively.

Particularly, according to the embodiments of the present disclosure, the process described above with reference to the flowchart may be implemented as a computer software program. For example, the embodiment of the present disclosure includes a computer program product, which includes a computer program carried by a computer readable medium. The computer program includes a program code for executing the method shown in the flowchart. In such an embodiment, the computer program may be downloaded online through the communication unit 909 and installed, or installed from the storage unit 908, or installed from the ROM 902. When the computer program is executed by the processing unit 901, the functions defined in the method of the embodiments of the present disclosure are executed.

It needs to be noted that the computer readable medium described above in the present disclosure may be a computer readable signal medium or a computer readable storage medium or any combination thereof. For example, the computer-readable storage medium may be, but not limited to, an electric, magnetic, optical, electromagnetic, infrared, or semiconductor system, apparatus or device, or any combination of them. More specific examples of the computer-readable storage medium may include but be not limited to an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof. In the present disclosure, the computer readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries thereon a computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable storage medium may send, propagate or transmit a program used by or in combination with an instruction execution system, apparatus or device. The program code included on the computer-readable medium may be transmitted by using any suitable medium, including but not limited to an electric wire, a fiber-optic cable, radio frequency (RF) and the like, or any appropriate combination thereof.

The above-mentioned computer-readable medium may be included in the electronic device described above, or may exist alone without being assembled with the electronic device.

The above-mentioned computer readable medium may carry one or more programs which, when executed by the electronic device, cause the electronic device to carry out the method illustrated in the above embodiments.

Computer program code for performing the operations in the present disclosure may be written in one or more programming languages or a combination thereof. The programming languages include object-oriented programming languages, such as Java, Smalltalk, and C++, and conventional procedural programming languages, such as C or similar programming languages. The program code can be executed fully on a user's computer, executed partially on a user's computer, executed as an independent software package, executed partially on a user's computer and partially on a remote computer, or executed fully on a remote computer or a media library. In the scenario with a remote computer, the remote computer may be connected to the user's computer through any type of networks including a local area network (LAN) or a wide area network (WAN), or may be connected to an external computer (e.g., through the Internet connection from an Internet Service Provider).

A computer program product provided in the present embodiment includes computer instructions. The computer instructions, when executed by a processor, cause the method described above to be implemented, and the implementation principles and the technical effects are similar to those described above, which will not be redundantly described here.

The flowcharts and block diagrams in the accompanying drawings illustrate system architectures, functions and operations that may be implemented by the system, method and computer program product according to the embodiments of the present disclosure. In this regard, each block in the flowcharts or block diagrams may represent a module, a program segment or a part of code, and the module, the program segment or the part of code includes one or more executable instructions for implementing specified logic functions. It should also be noted that in some optional embodiments, functions marked in the blocks may also take place in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Related units described in the embodiments of the present disclosure may be implemented by software, or may be implemented by hardware. The name of a unit does not constitute a limitation on the unit itself. For example, a first acquisition unit may also be described as "a unit for obtaining at least two Internet protocol addresses".

The functions described above herein may be performed at least in part by one or more hardware logic components. For example, exemplary types of hardware logic components that can be used without limitations include a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium that may include or store a program for use by or in combination with an instruction execution system, apparatus or device. The machine-readable medium may be a machine-readable signal medium or a machine-readable storage medium. The machine-readable medium may include but be not limited to an electronic, magnetic, optical, electromagnetic, infrared, or semiconductor system, apparatus or device, or any appropriate combination thereof. More specific examples of the machine-readable storage medium may include an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof.

Some embodiments of the present disclosure are described below.

In the first aspect, according to one or more embodiments of the present disclosure, a display method for information includes:

receiving information to be displayed that is sent by a server in response to an information display request triggered by a user for a target object, the information to be displayed includes first-level information and second-level information, the first-level information is information for the target object and the second-level information is a reply to the first-level information;

determining a feature attribute of the information to be displayed and determining a display mode for the second-level information according to the feature attribute; and displaying the second-level information in an information display region based on the display mode for the second-level information.

Optionally, the feature attribute of the information to be displayed includes a total number of pieces of information of the information to be displayed; and correspondingly, the determining a feature attribute of the information to be displayed and determining a display mode for the second-level information according to the feature attribute of the information to be displayed include:

determining the total number of pieces of information of the information to be displayed and determining the display mode for the second-level information according to the total number of pieces of information.

Optionally, the determining the display mode for the second-level information according to the total number of pieces of information includes:

determining whether the total number of pieces of information is less than a number threshold; and if the total number of pieces of information is less than the number threshold, displaying the second-level information in a tiling manner in the information display region.

Optionally, the display method further includes:

if the total number of pieces of information is greater than or equal to the number threshold, displaying the second-level information in a folding manner in the information display region.

Optionally, the feature attribute of the information to be displayed includes a display height required by the information to be displayed; and correspondingly, the determining a feature attribute of the information to be displayed and determining a display mode for the second-level information according to the feature attribute of the information to be displayed include:

determining the display height required by the information to be displayed and determining the display mode for the second-level information according to the display height required by the information to be displayed.

Optionally, the determining the display height required by the information to be displayed and determining the display mode for the second-level information according to the display height required by the information to be displayed include:

determining a display height required for displaying the information to be displayed in the tiling manner according to a number of rows and an information row spacing of the information to be displayed; and if a display height of the information display region is greater than or equal to the display height required, displaying the second-level information in the tiling manner.

Optionally, if the display height of the information display region is less than the display height required, the second-level information is displayed in the folding manner.

Optionally, the number of rows of the information to be displayed includes a number of rows of the first-level information and a number of rows of the second-level information, and the information row spacing includes a first information row spacing and a second information row spacing, the first information row spacing is a row spacing corresponding to the first-level information, and the second information row spacing is a row spacing corresponding to the second-level information; and correspondingly, the determining a display height required for displaying the information to be displayed in the tiling manner according to a number of rows and an information row spacing of the information to be displayed includes:

determining the display height required for displaying the information to be displayed in the tiling manner according to the number of rows of the first-level information, the number of rows of the second-level information, the first information row spacing, and the second information row spacing.

Optionally, if the display height of the information display region is greater than or equal to the display height required, the display method further includes:

adjusting the display height of the information display region according to the display height required for displaying the information to be displayed in the tiling manner.

Optionally, the feature attribute of the information to be displayed includes a display area required by the information to be displayed; and correspondingly, the determining a feature attribute of the information to be displayed and determining a display mode for the second-level information according to the feature attribute include:

determining a display area required for displaying the information to be displayed in the tiling manner and determining the display mode for the second-level information according to the display area required by the information to be displayed.

Optionally, the information to be displayed further includes Nth-level information, the N being a positive integer greater than 2, the Nth-level information is a reply to (N-1)th-level information.

The display method further includes:

determining a display mode for the Nth-level information according to the feature attribute; and displaying the Nth-level information in the information display region based on the display mode for the Nth-level information.

Optionally, the display method further includes:

determining the display height of the information display region and/or the information row spacing according to a terminal configuration.

In the second aspect, according to one or more embodiments of the present disclosure, a display apparatus for information includes:

an interaction module configured to receive information to be displayed that is sent by a server in response to an information display request triggered by a user for a target object, the information to be displayed includes first-level information and second-level information, the first-level information is information for the target object and the second-level information is a reply to the first-level information;

a processing module configured to determine a feature attribute of the information to be displayed and determine a display mode for the second-level information according to the feature attribute; and a display module configured to display the second-level information in an information display region based on the display mode for the second-level information.

Optionally, the feature attribute of the information to be displayed includes a total number of pieces of information of the information to be displayed; and the processing module is configured to determine the total number of pieces of information of the information to be displayed and determine the display mode for the second-level information according to the total number of pieces of information.

Optionally, the processing module is specifically configured to determine whether the total number of pieces of information is less than a number threshold, and if the total number of pieces of information is less than the number threshold, display the second-level information in a tiling manner in the information display region.

Optionally, the processing module is specifically configured to, if the total number of pieces of information is greater than or equal to the number threshold, display the second-level information in a folding manner in the information display region.

Optionally, the feature attribute of the information to be displayed includes a display height required by the information to be displayed; and the processing module is specifically configured to determine the display height required by the information to be displayed and determine the display mode for the second-level information according to the display height required by the information to be displayed.

Optionally, the processing module is specifically configured to determine a display height required for displaying the information to be displayed in the tiling manner according to a number of rows and an information row spacing of the information to be displayed, and if a display height of the information display region is greater than or equal to the display height required, display the second-level information in the tiling manner.

Optionally, the processing module is specifically further configured to, if the display height of the information display region is less than the display height required, display the second-level information in the folding manner.

Optionally, the number of rows of the information to be displayed includes a number of rows of the first-level information and a number of rows of the second-level information, and the information row spacing includes a first information row spacing and a second information row spacing, the first information row spacing is a row spacing corresponding to the first-level information, and the second information row spacing is a row spacing corresponding to the second-level information. The processing module is specifically further configured to determine the display height required for displaying the information to be displayed in the tiling manner according to the number of rows of the first-level information, the number of rows of the second-level information, the first information row spacing, and the second information row spacing.

Optionally, if the display height of the information display region is greater than or equal to the display height required, the processing module is specifically further configured to adjust the display height of the information display region according to the display height required for displaying the information to be displayed in the tiling manner.

Optionally, the feature attribute of the information to be displayed includes a display area required by the information to be displayed; and the processing module is specifically configured to determine a display area required for displaying the information to be displayed in the tiling manner and determine the display mode for the second-level information according to the display area required by the information to be displayed.

Optionally, the information to be displayed further includes Nth-level information, the N being a positive integer greater than 2, the Nth-level information is a reply to (N-1)th-level information; and the processing module is specifically further configured to determine a display mode for the Nth-level information according to the feature attribute and display the Nth-level information in the information display region based on the display mode for the Nth-level information.

Optionally, the processing module is further configured to determine the display height of the information display region and/or the information row spacing according to a terminal configuration.

In a third aspect, according to one or more embodiments of the present disclosure, an electronic device includes: at least one processor and a memory, the memory stores computer-executable instructions; and the at least one processor executes the computer-executable instructions stored on the memory and is caused to carry out the display method described above.

In a fourth aspect, according to one or more embodiments of the present disclosure, a computer-readable storage medium is provided, computer-executable instructions are stored on the computer-readable storage medium, and a processor, when executing the computer-executable instructions, implements the display method described above.

In a fifth aspect, according to one or more embodiments of the present disclosure, a computer program product includes computer instructions, when the computer instructions are executed by a processor, the display method described above is implemented.

In a sixth aspect, according to one or more embodiments of the present disclosure, a computer program is provided, which is configured to implement the display method described above.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A display method for information, comprising:
receiving information to be displayed in response to an information display request, wherein the information to be displayed comprises first-level information and second-level information, wherein the second-level information is a reply to the first-level information;
determining a feature attribute of the information to be displayed, wherein the feature attribute comprises a total number of pieces of the information to be displayed;
determining a display mode for the second-level information from a plurality of display modes for the second-level information according to the feature attribute, wherein the plurality of display modes comprise a first display mode in which the second-level information is displayed in response to receiving user input, and the plurality of display modes further comprises a second display mode in which the second-level information is directly displayed with no need of user input; and
displaying the second-level information in an information display region based on the determined display mode for the second-level information, wherein the determined display mode for the second-level information is one of the plurality of display modes for the second-level information, and wherein the displaying the second-level information in an information display region based on the determined display mode for the second-level information comprises:
synchronously displaying the second-level information with the first-level information in the information display region based on the one of the plurality of display modes for the second-level information.

2. The display method according to claim 1, wherein the feature attribute of the information to be displayed comprises a total number of pieces of information of the information to be displayed; and
correspondingly, the determining the feature attribute of the information to be displayed and determining the display mode for the second-level information according to the feature attribute comprise:
determining the total number of pieces of information of the information to be displayed and determining the display mode for the second-level information according to the total number of pieces of information.

3. The display method according to claim 2, wherein the determining the display mode for the second-level information according to the total number of pieces of information comprises:
determining whether the total number of pieces of information is less than a number threshold; and if the total number of pieces of information is less than the number threshold, displaying the second-level information in a tiling manner in the information display region.

4. The display method according to claim 3, further comprising:
if the total number of pieces of information is greater than or equal to the number threshold, displaying the second-level information in a folding manner in the information display region.

5. The display method according to claim 1, wherein the feature attribute of the information to be displayed comprises a display height required by the information to be displayed; and
correspondingly, the determining the feature attribute of the information to be displayed and determining the display mode for the second-level information according to the feature attribute comprise:
determining the display height required by the information to be displayed and determining the display mode for the second-level information according to the display height required by the information to be displayed.

6. The display method according to claim 5, wherein the determining the display height required by the information to be displayed and determining the display mode for the second-level information according to the display height required by the information to be displayed comprise:
determining a display height required for displaying the information to be displayed in a tiling manner according to a number of rows and an information row spacing of the information to be displayed; and
if a display height of the information display region is greater than or equal to the display height required, displaying the second-level information in the tiling manner.

7. The display method according to claim 6, wherein if the display height of the information display region is less than the display height required, the second-level information is displayed in a folding manner.

8. The display method according to claim 6, wherein the number of rows of the information to be displayed comprises a number of rows of the first-level information and a number of rows of the second-level information, and the information row spacing comprises a first information row spacing and a second information row spacing, wherein the first information row spacing is a row spacing corresponding to the first-level information, and the second information row spacing is a row spacing corresponding to the second-level information; and
correspondingly, the determining a display height required for displaying the information to be displayed in the tiling manner according to a number of rows and an information row spacing of the information to be displayed comprises:
determining the display height required for displaying the information to be displayed in the tiling manner according to the number of rows of the first-level information, the number of rows of the second-level information, the first information row spacing, and the second information row spacing.

9. The display method according to claim 6, wherein if the display height of the information display region is greater than or equal to the display height required, the display method further comprises:

adjusting the display height of the information display region according to the display height required for displaying the information to be displayed in the tiling manner.

10. The display method according to claim 1, wherein the feature attribute of the information to be displayed comprises a display area required by the information to be displayed; and correspondingly, the determining the feature attribute of the information to be displayed and determining the display mode for the second-level information according to the feature attribute comprise:
determining a display area required for displaying the information to be displayed in the tiling manner and determining the display mode for the second-level information according to the display area required by the information to be displayed.

11. The display method according to claim 1, wherein the information to be displayed further comprises Nth-level information, the N being a positive integer greater than 2, wherein the Nth-level information is a reply to (N−1)th-level information;

the display method further comprising:
determining a display mode for the Nth-level information according to the feature attribute; and
displaying the Nth-level information in the information display region based on the display mode for the Nth-level information.

12. The display method according to claim 1, further comprising:
determining the display height of the information display region, and/or a display area of the information display region, and/or an information row spacing according to a terminal configuration.

13. An electronic device, comprising:
at least one processor; and a memory,
wherein the memory stores a computer-executable instruction; and the at least one processor executes the computer-executable instruction stored on the memory and is caused to execute operations comprising:
receiving information to be displayed in response to an information display request, wherein the information to be displayed comprises first-level information and second-level information, wherein the second-level information is a reply to the first-level information;
determining a feature attribute of the information to be displayed, wherein the feature attribute comprises a total number of pieces of the information to be displayed;
determining a display mode for the second-level information from a plurality of display modes for the second-level information according to the feature attribute, wherein the plurality of display modes comprise a first display mode in which the second-level information is displayed in response to receiving user input, and the plurality of display modes further comprises a second display mode in which the second-level information is directly displayed with no need of user input; and
displaying the second-level information in an information display region based on the determined display mode for the second-level information, wherein the determined display mode for the second-level information is one of the plurality of display modes for the second-level information, and wherein the displaying the second-level information in an information display region based on the determined display mode for the second-level information comprises:
synchronously displaying the second-level information with the first-level information in the information display region based on the one of the plurality of display modes for the second-level information.

14. A non-transitory computer-readable storage medium, wherein a computer-executable instruction is stored on the computer-readable storage medium, and a processor, upon executing the computer-executable instruction, implements operations comprising:
receiving information to be displayed in response to an information display request, wherein the information to be displayed comprises first-level information and second-level information, wherein the second-level information is a reply to the first-level information;
determining a feature attribute of the information to be displayed, wherein the feature attribute comprises a total number of pieces of the information to be displayed;
determining a display mode for the second-level information from a plurality of display modes for the second-level information according to the feature attribute, wherein the plurality of display modes comprise a first display mode in which the second-level information is displayed in response to receiving user input, and the plurality of display modes further comprises a second display mode in which the second-level information is directly displayed with no need of user input; and
displaying the second-level information in an information display region based on the determined display mode for the second-level information, wherein the determined display mode for the second-level information is one of the plurality of display modes for the second-level information, and wherein the displaying the second-level information in an information display region based on the determined display mode for the second-level information comprises:
synchronously displaying the second-level information with the first-level information in the information display region based on the one of the plurality of display modes for the second-level information.

15. A computer program product, comprising a computer instruction, wherein the computer instruction upon being executed by a processor implements the display method according to claim 1.

16. The display method according to claim 7, wherein the number of rows of the information to be displayed comprises a number of rows of the first-level information and a number of rows of the second-level information, and the information row spacing comprises a first information row spacing and a second information row spacing, wherein the first information row spacing is a row spacing corresponding to the first-level information, and the second information row spacing is a row spacing corresponding to the second-level information; and correspondingly, the determining a display height required for displaying the information to be displayed in the tiling manner according to a number of rows and an information row spacing of the information to be displayed comprises:
determining the display height required for displaying the information to be displayed in the tiling manner according to the number of rows of the first-level information, the number of rows of the second-level information, the first information row spacing, and the second information row spacing.

17. The display method according to claim 7, wherein if the display height of the information display region is greater than or equal to the display height required, the display method further comprises:
   adjusting the display height of the information display region according to the display height required for displaying the information to be displayed in the tiling manner.

18. The display method according to claim 2, wherein the information to be displayed further comprises Nth-level information, the N being a positive integer greater than 2, wherein the Nth-level information is a reply to (N−1)th-level information;
   the display method further comprising:
      determining a display mode for the Nth-level information according to the feature attribute; and
      displaying the Nth-level information in the information display region based on the display mode for the Nth-level information.

19. The display method according to claim 2, further comprising:
   determining the display height of the information display region, and/or a display area of the information display region, and/or an information row spacing according to a terminal configuration.

* * * * *